(12) United States Patent
Dong et al.

(10) Patent No.: US 8,482,575 B2
(45) Date of Patent: Jul. 9, 2013

(54) METHOD FOR HIGHLIGHTING TOPIC ELEMENT AND SYSTEM THEREOF

(75) Inventors: Jin Dong, Beijing (CN); Li Xia, Beijing (CN); Ming Xie, Beijing (CN); Wen Jun Yin, Beijing (CN); Li Li Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 625 days.

(21) Appl. No.: 12/767,257

(22) Filed: Apr. 26, 2010

(65) Prior Publication Data

US 2010/0277497 A1 Nov. 4, 2010

(30) Foreign Application Priority Data

Apr. 30, 2009 (CN) .......................... 2009 1 0132264

(51) Int. Cl.
G09G 5/02 (2006.01)
(52) U.S. Cl.
USPC ........... 345/589; 345/591; 345/619; 345/440; 345/441; 345/467; 382/162; 382/167; 382/274; 715/200; 715/215
(58) Field of Classification Search
None
See application file for complete search history.

(56) References Cited

U.S. PATENT DOCUMENTS

| 6,463,173 | B1 | 10/2002 | Tretter |
| 7,136,074 | B2 | 11/2006 | Hussie |
| 7,262,778 | B1 | 8/2007 | Edwards |
| 7,352,912 | B2 * | 4/2008 | Eschbach ...................... 382/264 |
| 7,365,877 | B2 * | 4/2008 | Meier et al. .................... 358/1.9 |
| 7,379,074 | B2 | 5/2008 | Gerhard |
| 2009/0024579 | A1 * | 1/2009 | Obrador ........................... 707/3 |

\* cited by examiner

Primary Examiner — Antonio A Caschera
(74) Attorney, Agent, or Firm — Vazken Alexanian

(57) ABSTRACT

A method and system for determining highlighting colors for topic elements in a chart. The method includes acquiring contrast elements and topic elements which need to be highlighted, acquiring colors of the contrast elements and layout information of the topic elements and the contrast elements in the chart, determining a plurality of combinatorial contrast policies for the colors of the contrast elements according to a color contrast standard, calculating weights of the combinatorial contrast policies using the layout information, and determining highlighting colors of the topic elements according to the combinatorial contrast policies and their weights. A highlighting color can be selected automatically for the information that needs attention, so that the user can determine information that should be specially noted without having professional knowledge about color, saving time and energy.

20 Claims, 8 Drawing Sheets

METHOD FOR HIGHLIGHTING TOPIC ELEMENT AND SYSTEM THEREOF

CROSS REFERENCE TO RELATED APPLICATION

This application claims priority under 35 U.S.C. §119 from Chinese Patent Application No. 200910132264.1 filed Apr. 30, 2009, the entire contents of which are incorporated herein by reference.

BACKGROUND OF THE INVENTION

1. Field of the Invention

The present invention generally relates to a method and system for highlighting a topic element. In particular, a method and system for selecting highlighting color for a topic element in a chart having a plurality of contrast elements of a plurality of colors is presented.

2. Description of the Related Art

In a chart display, color is a very basic and important means of expression used for differentiating different types of elements in a chart. In many chart applications, there is an increasing number of elements in a chart, and the types of elements are becoming increasingly complicated. Consequently, it becomes necessary to use reasonable colors to represent respective types of elements so as to enable a user to obtain information of interest from the chart. FIG. 1 shows a flowchart of the Websphere business model that is relatively simple; however, it still has a lot of control nodes and general flow nodes. How to differentiate these nodes by using different colors so as to highlight the node which needs the user's special attention, such as node 101, is very important. Such node could be one node or more nodes of the same type or different types. Such a requirement is also very common in other image or graphics field such as cartology.

In the related art, methods which only consider color contrast are commonly applied. There are many standards relating to color contrast. For instance, in a contrast ratio standard such as the Web Content Accessibility Guidelines 2.0 (http://www.w3org/TR/2008/CR-WCAG20-20080430/), stipulated by World Wide Web Consortium (referred to W3C for short, a nonprofit organization for stipulating web standard), the concept of contrast ratio is introduced and is defined as (L1+0.05)/(L2+0.05), the value of which is within a range of 1-21 (i.e. 1:1-21:1). It also defines contrast levels, and for example, the value of the contrast ratio which is capable of differentiating foreground and background strongly with colors is above 7:1 (AAA level). The minimum value of the contrast ratio which enables a user to differentiate the foreground and the background of a web page with colors is above 5:1 (AA level). For some colors, when the contrast level is determined, the highlighting color set (contrast color set) corresponding to the color is also determined according to a corresponding standard. Accordingly, those skilled in the art can also establish different contrast levels such as a four-star level and a five-star level in comparison to this standard according to different requirements, wherein:

L1 is relative luminance of the brighter color, L2 is relative luminance of the darker color;

The relative luminance (abbreviated as L thereinafter) is defined as:

$$L = 0.2126*R' + 0.7152*G' + 0.0722*B'$$

Where R', G', and B' are calculated as follows:

If $RsRGB <= 0.03928$, then $R' = RsRGB/12.92$, otherwise $R' = ((RsRGB + 0.055)/1.055)^{2.4}$ If $GsRGB <= 0.03928$, then $G' = GsRGB/12.92$, otherwise $G' = ((GsRGB + 0.055)/1.055)^{2.4}$ If $BsRGB <= 0.03928$, then $B' = BsRGB/12.92$, otherwise $B' = ((BsRGB + 0.055)/1.055)^{2.4}$ RsRGB, GsRGB, and BsRGB are defined as:

$$RsRGB = R8 \text{ bit}/255$$

$$GsRGB = G8 \text{ bit}/255$$

$$BsRGB = B8 \text{ bit}/255$$

R8 bit, G8 bit, and B8 bit represent RGB values of colors, RGB color mode obtains various colors by varying the three color channels of red (R), green (G), and blue (B) and overlaying them to each other, wherein RGB are the colors representing the three channels of red, green, and blue.

As further exemplified, the hue difference standard (a fact standard) which is often used in the art introduces a concept of hue difference hue which is defined as:

$$\Delta hue = |hue_1 - hue_2|$$

wherein hue1 and hue2 are hue values (Hue) of two colors respectively, hue is a parameter of color mode HSV or HSB, that is, Hue, Saturation, Luminance Value or Brightness, Δhue is an angle between two colors on the hue ring as illustrated in FIG. 2, the value of the hue difference is within a range of 0-180°, and the HSV value of color and the aforementioned RGB value can be converted there between. When comparing two colors, the value of Δhue difference hue is larger, the contrast between the two colors is stronger, and thus the effect for the user to visually differentiate the two colors is better. Http://colorschemedesigner.com/previous/colorscheme2/index-en.html visually provides such a tool, by which when a user selects a background color, a foreground color in strong contrast with that background color can be displayed very conveniently. The hue differences of contrast levels—AAA, AA, A provided by the tool are respectively 180°, above 120°, and above 90°. Likewise, those skilled in the art can define different levels as required.

U.S. Pat. No. 6,463,173B, "System and method for histogram-based image contrast enhancement," discloses a method of operating a computer to produce contrast enhanced digital images. The method commences with the step of producing a histogram having a first axis corresponding to a measurable property such as luminance and a second axis corresponding to a count of pixels having a particular value for the measurable property. This histogram is divided into clusters. Histogram equalization or stretching is performed on each cluster producing a modified histogram. The modified histogram is used to adjust the value of the first measurable property in the digital form, thereby producing a contrast enhanced image. The histogram is divided into clusters using a pattern matching technique. For example, patterns in the histogram that resemble Gaussian distributions and patterns that resemble uniform distributions are separated into individual clusters.

However, the above references just considered contrast colors per se, and cannot highlight information which needs user's special attention in an increasingly complicated chart. Currently, most of the related art performs comparison of a single color by manual interaction of the user, which is energy and time consuming and cannot obtain a good effect, as it usually requires the user to have professional knowledge about colors. Moreover, there are methods for assigning colors randomly, which usually neglect the information which needs a user's special attention.

SUMMARY OF THE INVENTION

An aspect of the present invention provides a method for selecting highlighting colors for topic elements in a chart. The method includes:

acquiring contrast elements and topic elements which need to be highlighted;

acquiring colors of the contrast elements and layout information of the topic elements and the contrast elements in the chart;

determining a plurality of combinatorial contrast policies for the colors of the contrast elements according to a color contrast standard;

calculating weights of the combinatorial contrast policies using the layout information; and determining the highlighting colors for the topic elements according to the combinatorial contrast policies and their weights.

Another aspect of the present invention provides a system of selecting highlighting colors for topic elements in a chart. The system includes:

means for acquiring contrast elements and topic elements which need to be highlighted;

means for acquiring colors of the contrast elements and layout information of the topic elements and contrast elements in the chart;

means for determining a plurality of combinatorial contrast policies for the colors of the contrast elements according to a color contrast standard;

means for calculating weights of the combinatorial contrast policies using the layout information; and means for determining highlighting colors of the topic elements according to the combinatorial contrast policies and their weights.

Therefore, highlighting colors can be selected automatically for the information which needs user's special attention, such that the user can determine the information to which attention should be paid in a complicated chart efficiently without having related professional knowledge on colors, while saving time and energy of the user.

BRIEF DESCRIPTION OF THE DRAWINGS

For the purpose of describing features and advantages of embodiments of the present invention in detail, the following figures will be referenced. The same or similar reference numbers are used throughout the drawings and the description to indicate the same or similar parts, wherein.

DETAILED DESCRIPTION OF THE PREFERRED EMBODIMENT

Figure 1:
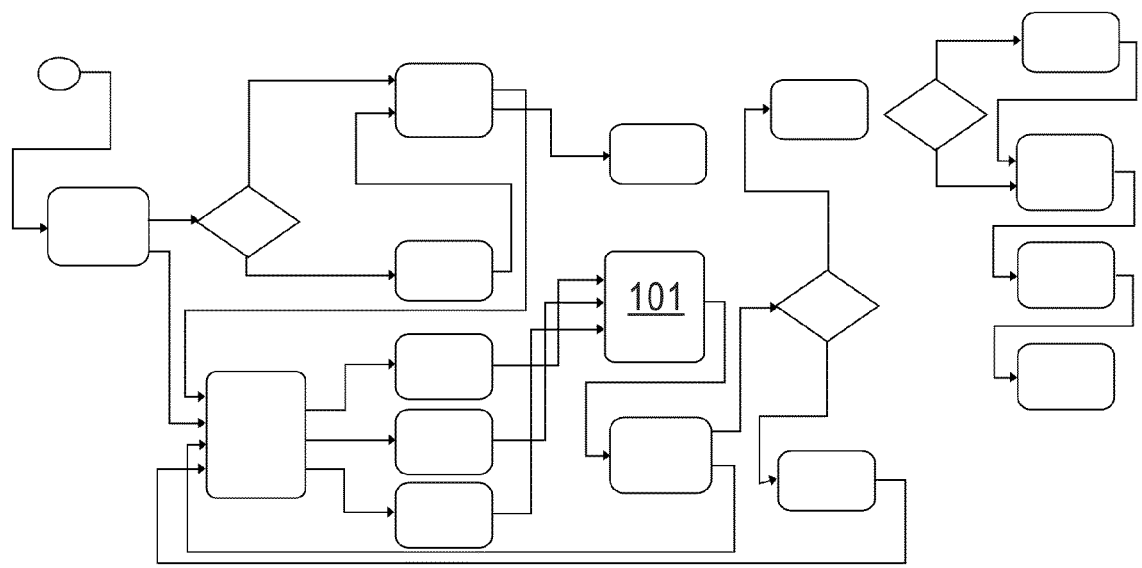
FIG. 1 shows a flowchart of the Websphere business model.
Figure 2:
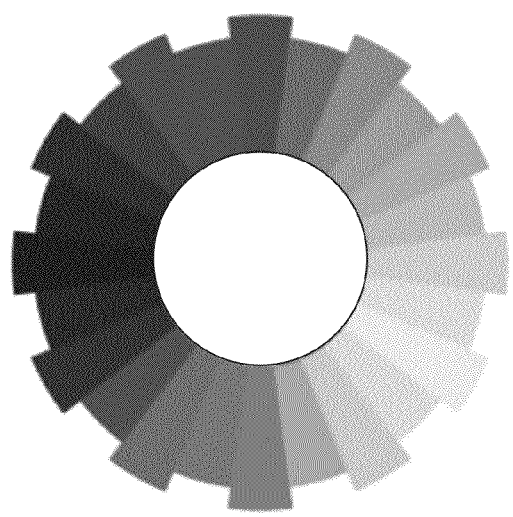
FIG. 2 shows the hue ring in the prior art.

Description is now made with reference to an illustrated embodiment of the present invention. Examples of the embodiments are described illustratively in the drawings, wherein the same reference numbers always indicate the same components. It should be understood that the present invention is not limited to the disclosed exemplary embodiments. It should be also understood that not every feature of the method and device is essential for implementing the invention claimed in any one of the claims. Moreover, in the entire disclosure, when displaying or describing a process or method, steps of the present method can be executed in any order or simultaneously, unless it is clear from the context that one step relies on another step performed previously. Moreover, there could be significant time intervals between respective steps.

The present invention is described in general. In an increasingly complicated chart, elements which need user's special attention usually need to be highlighted, and such elements which need user's special attention are often called topic elements. There can be a plurality of topic elements, the plurality of topic elements may belong to the same type and adopt the same color for representation, or may be different types and respectively adopt different colors for representation. Usually, the elements which do not need the user's special attention are called contrast elements. Likewise, there can be a plurality of contrast elements, the plurality of contrast elements can belong to the same type and adopt the same color for representation, or can be different types and respectively adopt different colors for representation.

Figure 3:
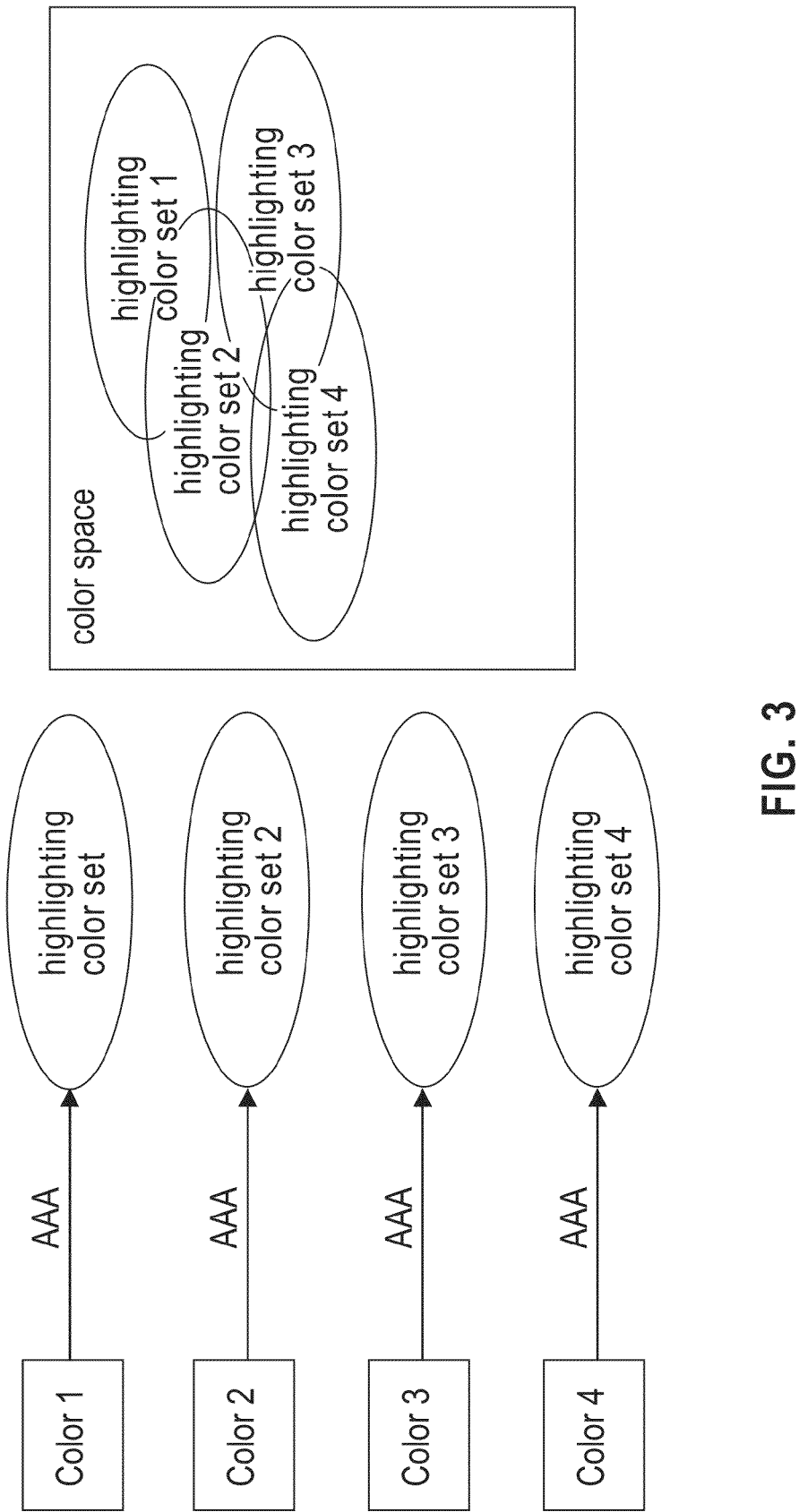
FIG. 3 shows a schematic diagram of a method for forming a highlighting color set.

A chart can be structured, such as, schematic diagram of the flow of a Websphere business model, as shown in FIG. 1, where elements are the respective components. A chart can also be unstructured, such as, general web electronic maps, wherein elements are color blocks constituted by continuous pixels with the same RGB value. The present invention differs from the related art in that the present invention considers not only the color contrast among elements, but also sufficiently considers layout information of topic elements and contrast elements in the chart. FIG. 3 shows four different contrast element colors 1-4. If a color contrast ratio between topic elements and contrast elements is expected to reach AAA level, then highlighting color sets 1-4 are formed in color space according to a related color contrast standard; if only color contrast is considered, the intersection of such highlighting color sets 1-4 is often empty, so that the topic elements cannot obtain highlighting color from the null intersection of highlighting color sets. The contrast policy combination AAA, AAA, AAA, AAA formed by the above plurality of colors of contrast elements according to a corresponding color contrast standard can be called combinatorial contrast policy.

If the contrast level is lowered, a plurality of combinatorial contrast policies can be formed, such as (AA, AAA, AAA, AA), (AA, AAA, AAA, A), and a plurality of non-null intersections can be formed. However, how to determine a relatively optimum topic element color from the plurality of non-null intersections remains a problem. After obtaining the color and distribution information of the contrast elements and the distribution information of the topic elements, an object of the embodiment of the invention is to select colors for the topic elements so as to highlight them better on the entire chart. The colors of the contrast elements have already been predetermined, so that the following model of objective function can be used to describe the problem:

Objective function:

$$\underset{\substack{\text{all of the combinatorial}\\\text{contrast policies}}}{\arg}\max\left\{\left[1-I_{\left(\bigcap_{j\in J}A_{(s_j,p_j,k_j)},\Phi\right)}\right]\sum_{j\in J}w_jk_j\right\}$$

Wherein:

j is the index of contrast elements or colors and it is assumed herein that the contrast elements belong to different types, the contrast elements and the colors of contrast elements are bijective. For elements having the same colors, they can be combined previously, j=1, 2, 3, . . . ;

J is a collection constituted by index j of all the contrast elements, that is, $$j\in J;$$

sj is a color indication for contrast element j;

pj is a relative position relationship between contrast element j and topic element, and pj=1, 2, 3 represent that the relative position relationship between contrast element j and topic element is overlapping, surrounding and isolating, respectively. Those skilled in the art can also consider other relative position classification based on the present invention.

kj is a contrast policy coefficient between contrast element j and the topic element, the meaning of which is related to the relative position relationship pj between contrast element j and the topic element. The policy coefficients for different relative position relationships are determined using a contrast standard in combination with a hue difference standard. Those skilled in the art can also consider defining contrast policy coefficients just using contrast standard or hue difference standard, or using one of the color contrast standards of other types or in combination. The contrast policy coefficients 3, 2, 1, 0 below correspond to contrast policies AAA, AA, A, 0 levels.

When pj=1, that is, the relative position relationship between the contrast element and the topic element is overlapping, $$k_j = \begin{cases} 3, & \text{if contrast ratio} \geq 7, \Delta hue \geq 60° \\ 2, & \text{if contrast ratio} \geq 5, \Delta hue \geq 60° \\ 1, & \text{if contrast ratio} \geq 3, \Delta hue \geq 60° \\ 0, & \text{no contrast ratio}, \end{cases}$$

Δhue and the contrast policy coefficients can be adjusted by those skilled in the art as practically required.

When pj=2, that is, the relative position relationship between the contrast element and the topic element is surrounding, $$k_j = \begin{cases} 3, & \text{if } \Delta hue \geq 120°, \text{contrast ratio} \geq 3 \\ 2, & \text{if } \Delta hue \geq 90°, \text{contrast ratio} \geq 3 \\ 1, & \text{if } \Delta hue \geq 60°, \text{contrast ratio} \geq 3 \\ 0, & \text{no contrast ratio}; \end{cases}$$

When pj=3, that is, the relative position relationship between the contrast element and the topic element is isolating, $$k_j = \begin{cases} 3, & \text{if } \Delta hue \geq 120° \\ 2, & \text{if } \Delta hue \geq 90° \\ 1, & \text{if } \Delta hue \geq 60° \\ 0, & \text{no contrast ratio}; \end{cases}$$

A(sj, pj, kj) is the collection of all the possible highlighting colors of the topic element under the condition that the colors of the topic element and the contrast element j satisfy the contrast policy;

$I_{(a,b)}$ is an characteristic function, expressed by if $a=b, I_{(a,b)}=1$;

otherwise, $I_{(a,b)}=0$;

Wj is the weight of the color of the contrast element j.

One example of method for calculating the weight Wj of contrast element is as follows, assuming that the number of topic elements is n, the number of the colors of contrast elements is m, and the weight Wj of the color of a contrast element can be calculated as follows:

calculating the total area of the contrast element $$j: S_j = \iint_{D_j} dxdy,$$

$D_j$ is the region occupied by the contrast element;

calculating the average distance dj from the contrast element j to the geometry centers of the respective topic elements, assuming the center coordinates of the respective topic elements are (x1, y1), (x2, y2), . . . , (xn, yn), and the coordinate of the contrast element j is (x, y)

$$d_j = \frac{\sum_{i=1}^{n}\iint_{D_j}\sqrt{(x-x_i)^2+(y-y_i)^2}\,dxdy}{S_j}$$

Figure 4:
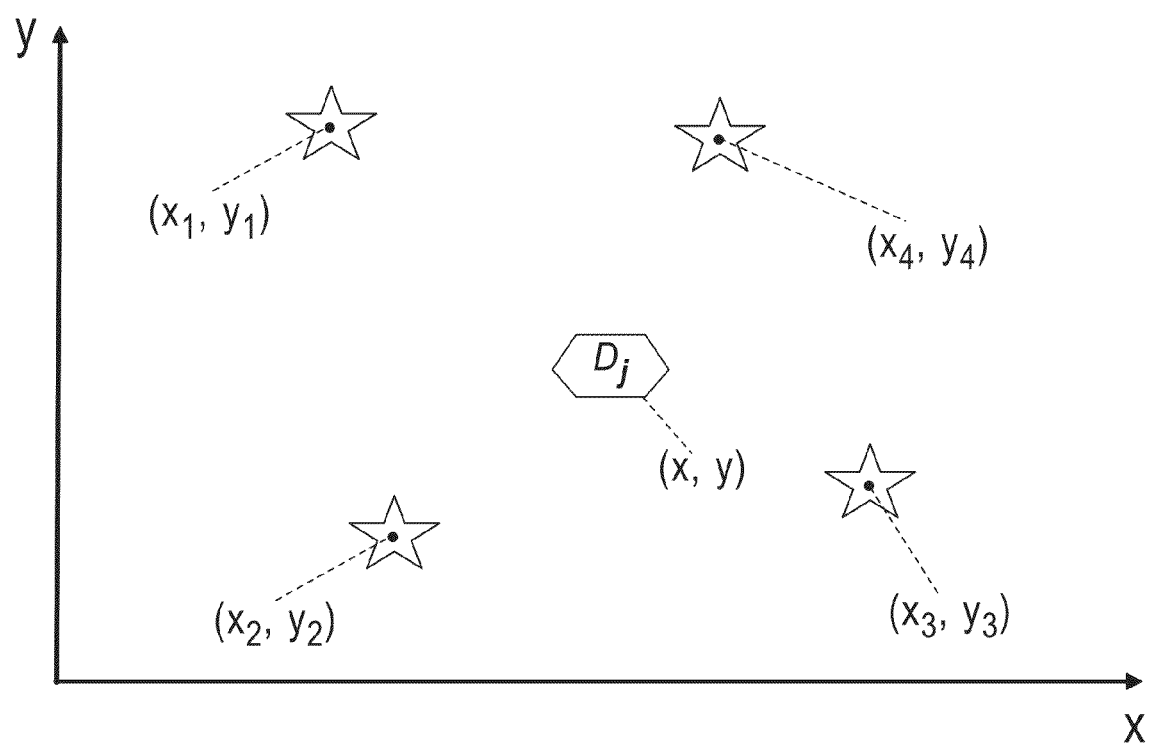
FIG. 4 shows a schematic diagram for calculating weights of the colors of the contrast elements.

FIG. 4 shows a schematic diagram for calculating average distance when n=4, wherein ☆ are the topic elements and the positions of the dark dot are their geometry centers, ○ is the contrast element, and Dj is the integrated region;

The weight is in inverse proportion with dj, and is in proportion with sj:

$$W_j = S_j/d_j$$

Since the shapes of topic elements and contrast elements are usually irregular, when implementing the above definite integration operation, approximation can be performed using a numerical method.

For the sake of simplicity, only the case where the color of the contrast element and the contrast element are in a one to one correspondence is described. In fact, the contrast element j herein can be a combination of a plurality of contrast elements having the same color, which can be expressed mathematically as:

$$S_j = \sum_r \iint_{D_{rj}} dx\,dy$$

The respective definite integration area Dj in the above formula for calculating Sj, dj is the sum:

$$D_{j1} + D_{j2} + \ldots + D_{jr}$$

where r is the number of the contrast elements having the same color of the contrast elements of the areas occupied by the plurality of contrast elements having the same color. Combining the contrast elements having the same color is an optimum algorithm. It is also feasible to calculate the weights of the contrast color of the respective contrast elements separately, and then sum up the resulted weights as the total weight of the contrast color of the respective contrast elements. Those skilled in the art can further contemplate more other equivalent alternative methods.

The above problem is a typical combinatorial optimization problem, which can be solved by a traditional combinatorial optimization algorithm such as a genetic algorithm or a simulated annealing algorithm. When the corresponding contrast policy kj of each contrast element j for maximizing the above objective function is calculated, that is, when such a set of contrast policies kj (combinatorial contrast policy) is taken, $$\bigcap_{j \in J} A(s_j, p_j, k_j)$$

can be assigned to the color of the topic element. If $$\bigcap_{j \in J} A(s_j, p_j, k_j)$$

has more than two colors, it can be considered that any one of them is assigned. At that time, the combinatorial contrast policy can maximize the contrast weighted evaluation function:

$$\sum_{j \in J} w_j k_j$$

of the colors between the topic element and the respective contrast elements, that is, the topic element and the respective contrast elements can be differentiated to the maximum extent under the defined contrast evaluation standard.

It should be noted that the above objective function model and method for calculating weights are not exclusive, but are the preferred manners of the present invention. Those skilled in the art can design other objective function model and methods for calculating the weights adapted for the present invention. For example, only taking isolating relationship into account when considering the relative position relationship between the topic element and the contrast element, or only considering the relationship of the geometry center position of the contrast elements with respect to the topic elements when calculating weights are both suitable models for the flowchart of Websphere business model as shown in FIG. 1. Moreover, the color contrast standard can be a combination of one or more standards, or a color contrast standard that meets a special chart need as defined by the user, which are both suitable calculating methods.

Figure 5:
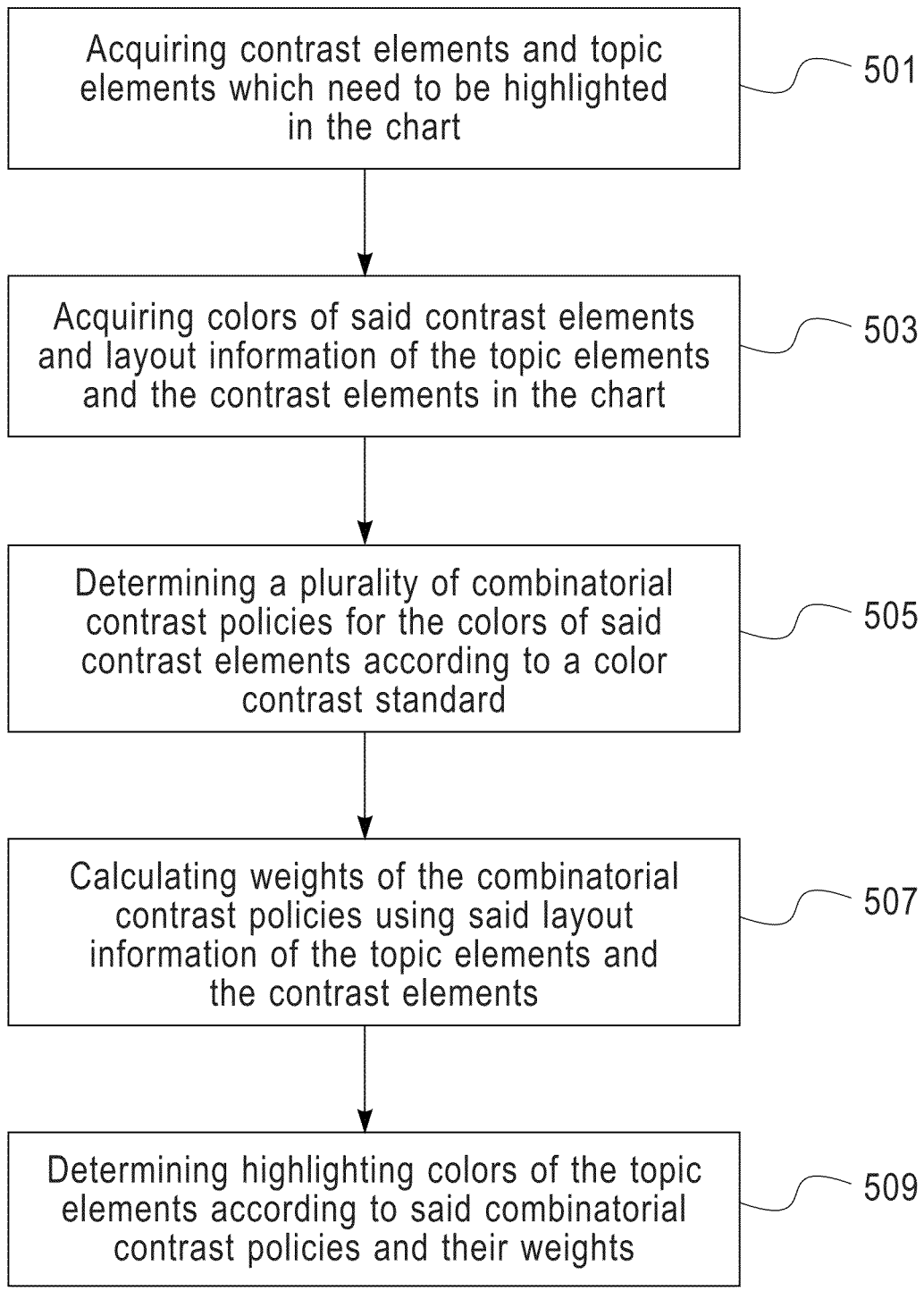
FIG. 5 shows a flowchart of an embodiment of the present invention.

FIG. 5 shows a flowchart of the first embodiment of the present invention. In step 501, contrast elements and topic elements which need to be highlighted in a chart are acquired. The topic elements and contrast elements can be components in a structured chart, or color blocks in an unstructured chart. In step 503, acquiring colors of the contrast elements and layout information between the topic elements and the contrast elements, the layout information can include center positions of the topic elements and the like, and center positions, distribution regions and relative positions with respect to the topic elements of the contrast elements. If the colors of the contrast elements do not exist, then different colors are assigned to the respective different types of contrast elements automatically. That is, the user can submit a blank chart for being processed such as FIG. 1.

In step 505, a plurality of combinatorial contrast policies for the colors of the contrast elements is determined according to a color contrast standard. Preferably, contrast policies for the colors of all the contrast elements are stipulated according to the contrast levels stipulated by the color contrast standard, such that these contrast policies form a combinatorial contrast policy.

A series of combinatorial contrast policies can be formed by changing the contrast policies corresponding to the colors of the respective contrast elements. In step 507, calculating the weights of the combinatorial contrast policies is performed using the layout information of the topic elements and the contrast elements. Preferably, the weights of the colors of the contrast elements are determined according to the layout information between the topic elements and the contrast elements. The weights of the colors of the plurality of contrast elements corresponding to the combinatorial contrast policy are multiplied with the coefficients of the plurality of corresponding contrast policies in the combinatorial contrast policy, and the plurality of products resulted from the above multiplication are summed up so as to obtain the weight of the combinatorial contrast policy.

In step 509, determining the highlighting colors of the topic elements according to the combinatorial contrast policy and its weight is performed. Preferably, highlighting color sets of the colors of the contrast elements are calculated according to the current combinatorial contrast policy, and intersections of the highlighting color sets are calculated. In response to determining that the intersections of the highlighting color sets are not null and the weight of the current combinatorial contrast policy is the maximum value among the weights of all the combinatorial contrast policies under which the intersections of the highlighting color sets are not null, one color in the intersection corresponding to the current combinatorial contrast policy is selected as the highlighting color of the topic elements.

Figure 6:
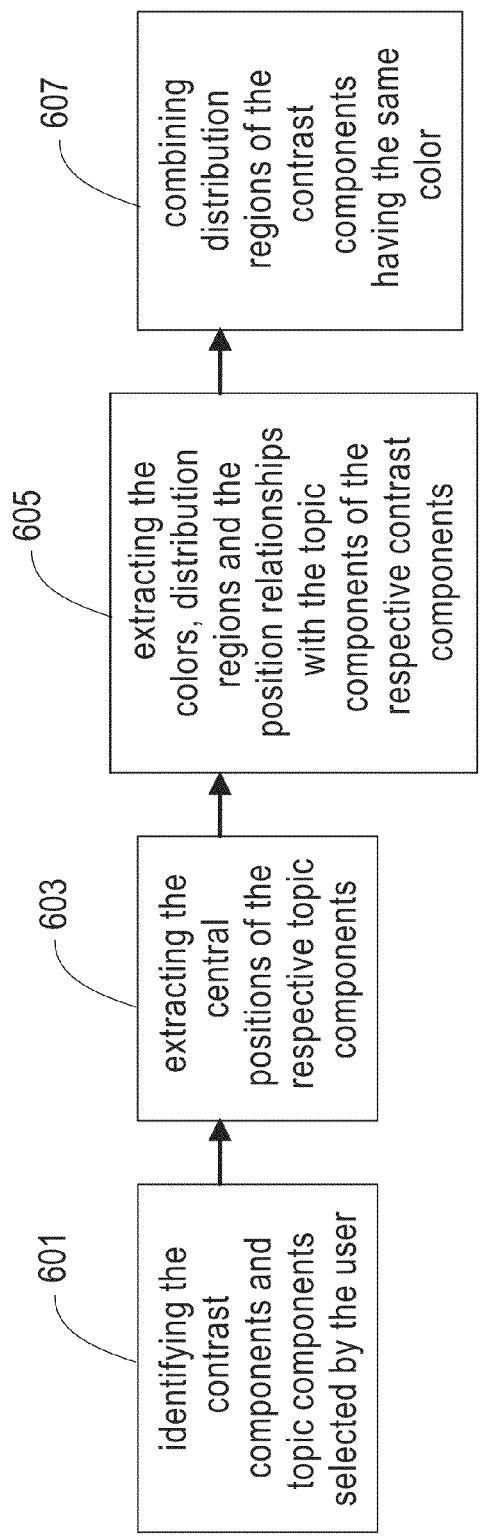
FIG. 6 shows a preprocess method for a structured chart.

Optionally, the steps 501, 503 in the first embodiment can be performed by the following preprocess. FIG. 6 shows a preprocess procedure for a structured chart. In the structured chart, the chart is constituted by several components, wherein the topic elements and the contrast elements are both the components. In step 601, identifying the contrast components and the topic components selected by the user, the user can designate corresponding contrast components and topic components directly by means of an operable interface; or the contrast components and topic components can be determined automatically by reading structured chart by a program according to some rules as defined by the user.

In step 603, the central positions of the respective topic components are extracted. For example, if the component is a regular pattern such as triangle, rectangle, etc., their geometry centers can be extracted; if not, their centroids can be extracted. The centroid can be calculated by a definite integration formula, or can be replaced approximately by the center of the peripheral rectangle of the pattern:

$$x_{center}=(\max(x)+\min(x))/2, y_{center}=(\max(y)+\min(y))/2$$

wherein (x, y) is the coordinates of the pattern in the chart, (xcenter, ycenter) is the coordinate of the center position.

Figure 7:
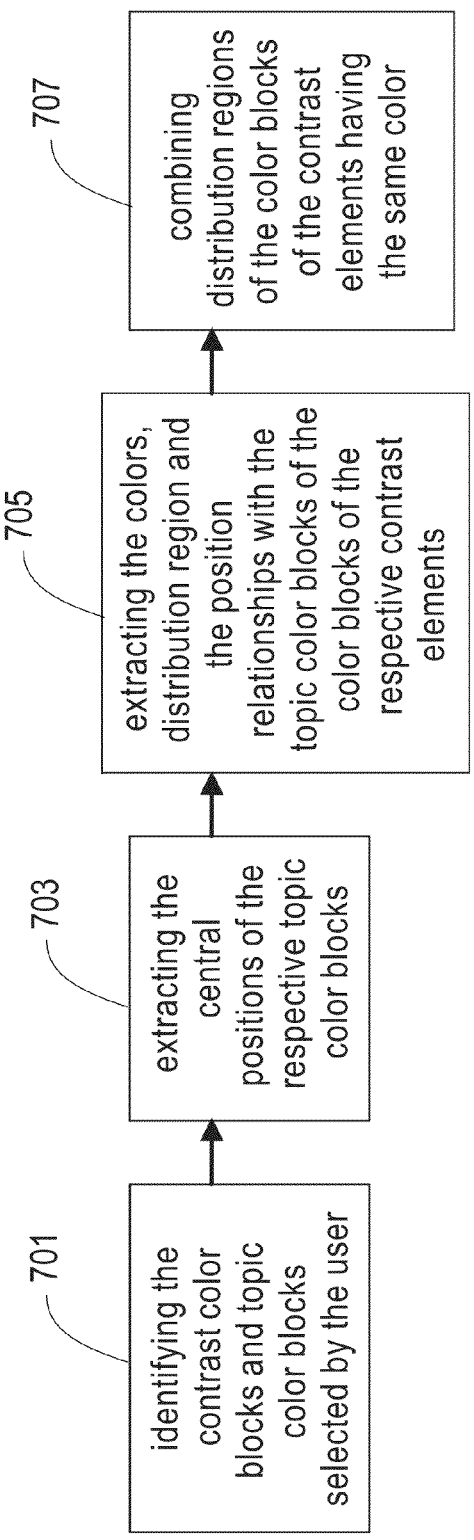
FIG. 7 shows a preprocess method for an unstructured chart.

In step 605, extracting the colors, distribution regions of the respective contrast components, and the relative position relationship between the respective contrast components and topic components is performed. The relative position relationship may include overlapping, surrounding, and isolating. In step 607, the step of combining the distribution regions of the contrast components having the same color is performed. FIG. 7 shows a preprocess procedure for an unstructured chart. In the unstructured chart, the unstructured chart consists of pixels. Continuous pixels having the same RGB values constitute a color block, so that topic elements and contrast elements are both color blocks.

In step 701, the color blocks of the contrast elements and the topic color blocks selected by the user are identified. The identification can be conducted by identifying whether the RGB values of the pixels are the same; additionally, the function of Magic Wand in the software such as Photoshop can identify a color block. A user can designate corresponding color blocks of contrast elements and topic color blocks directly by means of an operable interface; or the color blocks of contrast elements and topic color blocks can be determined automatically by reading chart by a program. In step 703, the central positions of the respective topic color blocks are exacted. In step 705, exacting the colors, distribution regions of the respective color blocks of contrast elements, and the relative position relationship between color blocks of the respective contrast elements and topic color blocks, the relative position relationship may include overlapping, surrounding, and isolating. In step 707, a step of combining the distribution regions of the color blocks of the contrast elements having the same color is performed.

Figure 8:
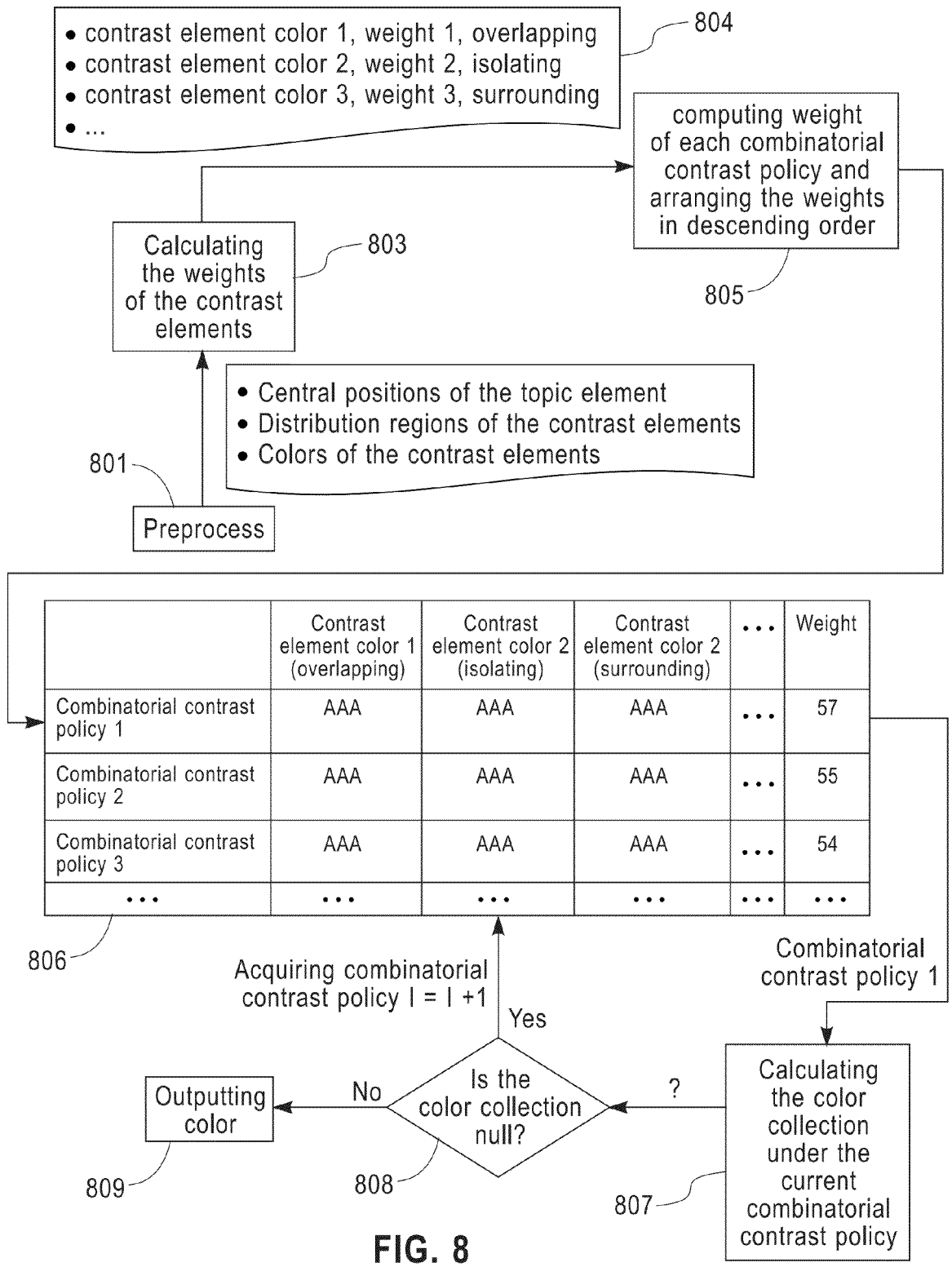
FIG. 8 shows a flowchart of another embodiment of the present invention.

FIG. 8 shows a flowchart of another embodiment of the present invention. In step 801, the preprocess step as described above is performed. In the step, the topic elements and contrast elements are determined, and the contrast elements having the same color are combined, and related information such as the center position of the topic element, the color of the contrast element, the distribution region of the contrast element, and the relative position relationship between the contrast element and the topic element are obtained. Of course, if the above information already exists in the chart to be processed, the preprocess does not need to be performed and the above information is read directly instead. In step 803, calculating the weights of the colors of the contrast elements (the combined contrast elements and the colors of the contrast elements are in one to one correspondence), and one of the above plurality of methods for calculating weights can be employed when calculating the weights of the colors of the contrast elements. Take 4 contrast element colors as an example, a table showing the relationship between colors and weights of contrast elements as shown in table 1 can be obtained, assuming that the weights corresponding to the contrast element colors 1-4 are 8, 6, 3 and 2, respectively (the weights are just illustrative).

TABLE 1

| | contrast element color 1 | contrast element color 2 | contrast element color 3 | contrast element color 4 |
|---|---|---|---|---|
| weight | W1 (e.g. 8) | W2 (e.g. 6) | W3 (e.g. 3) | W4 (e.g. 2) |

In step 801, as described previously, the combinatorial contrast policies 1, 2, . . . , I, I+1, . . . , n−1, n are determined by using color contrast standard levels in combination, wherein the number of the contrast evaluation standard levels is 4 in total, i.e. AAA level, AA level, A level, 0 level. The specific meaning of the contrast levels for the colors of the related contrast elements can be determined in combination with the relative position relationship such as overlapping, isolating, and surrounding as shown by reference number 804, and the above levels can be expressed by coefficients 4-0, respectively.

Since each contrast element color has 4 possible levels, there are 4m kinds of combinatorial contrast policies, where m is the number of different contrast element colors, and thus n=4m. The weights of the respective contrast element colors in one combinatorial contrast policy are multiplied with the corresponding contrast level coefficients and are then summed up, so as to obtain the weight of that kind of combinatorial contrast policy. Afterwards, the policy combinations are arranged according to the weights in descending order, so as to obtain a table of weights of the combinatorial contrast policies as shown by reference number 806. The weights of the above policy combinations can be expressed by using any current or future data structures. In step 807, traversing the table of the weights of the combinatorial contrast policies by serial numbers, and calculating the highlighting color set of the respective contrast element colors in the case of the current combinatorial policy I is performed.

The process for calculating a highlighting color set is the same as shown in FIG. 3. If the color contrast standard is a combination of a plurality of standards, such as the combination of hue difference standard and contrast ratio standard, then corresponding highlighting color sets can be calculated according to a hue difference standard and contrast ratio standard, respectively, and then the intersection of the above highlighting color sets can be solved. The intersection is the highlighting color set corresponding to the combination of the plurality of standards. The highlighting color set of each contrast element color can be determined according to the current policy of each contrast element color such as one of the levels AAA, AA, A, 0. Then, intersection is solved for the obtained highlighting color sets of each contrast element color, so as to obtain the color collection of the current combinatorial policy.

In step 808, it is judged whether the obtained color collection of the current combinatorial contrast policy I is null. If yes, the above solving step is repeated for the color collection of the combinatorial contrast policy for the next combinatorial contrast policy I+1, until the color collection of the combinatorial contrast policy is not null, then the process stops and outputs the color collection of the combinatorial contrast policy. The colors in the color collection may be more than one kind. However, since they comply with the same combinatorial contrast policy, any color in that collection can be assigned to the topic element. Since the above table of weights for the combinatorial policies is arranged in descending order, the color collection obtained now is the non-null color collection with the highest weight, so that the topic element will be highlighted with respect to the contrast elements.

Steps 806 and 807 can be combined, or further form a table of weights for intersections of the highlighting color set, a non-null intersection of the highlighting color set with the the combinatorial contrast policy q can be assigned to the topic element. The color of the topic element takes into account factors such as color, relative position, and distribution regions of the contrast elements, etc., so that whatever contrast elements are overlapping, surrounding or isolating can be highlighted.

TABLE 2

| | contrast element color 1 (overlapping) | contrast element color 2 (isolating) | contrast element color 3 (surrounding) | contrast element color4 (isolating) | Combinatorial policy weight | Highlighting color set |
|---|---|---|---|---|---|---|
| Combinatorial contrast policy 1 | AAA | AAA | AAA | AAA | $3W1 + 3W2 + 3W3 + 3W4$ (such as 57) | null |
| Combinatorial contrast policy 2 | AAA | AAA | AAA | AA | $3W1 + 3W2 + 3W3 + 2W4$ (such as 55) | null |
| ... | ... | ... | ... | ... | ... | ... |
| Combinatorial contrast policy q-1 | AA | AAA | AA | A | $2W1 + 3W2 + 2W3 + W2$ (such as 42) | null |
| Combinatorial contrast policy q | AA | AAA | A | AA | $2W1 + 3W2 + W3 + 2W2$ (such as 41) | Not null |
| ... | ... | ... | ... | ... | ... | ... | highest weight can be looked up directly with respect to the table of weights for highlighting color sets. As a simple example of the above process, the table 2 shows the above calculating process in combination with the weights in table 1, taking 4 kinds of colors as an example. The colors of the topic elements and the contrast element colors 1-4 are both selected to be the highest AAA level, and then the weight of the corresponding combinatorial contrast policy is $3W1+3W2+3W3+3W4=57$. Exhaustion is performed to all the combinatorial contrast policies sequentially, and their corresponding weights are calculated and arranged according to weights in descending order so as to form the table of weights for combinatorial policies. The highlighting color sets of the contrast element colors 1-4 that can reach the corresponding policy are calculated starting from the combinatorial policy with the highest weight according to the contrast color standard.

For example, for combinatorial contrast policy 1, highlighting color sets 1-4 of the contrast element colors 1-4 that can reach the highest AAA level should be calculated respectively. If it is found that there is no intersection among the highlighting color sets 1-4, that is, there is no color that can be comparable simultaneously to the case that the contrast element colors 1-4 reach the highest AAA level, then no color can be assigned to the topic element, and then combinatorial contrast policy 2 is considered. The combinatorial contrast policy 2 differs from the combinatorial contrast policy 1 in that, the contrast level of the contrast element color 4 is lowered from the original AAA level to AA level. Likewise, the highlighting color sets 1-4 of the contrast element colors 1-4 that can reach the respective contrast levels under the combinatorial policy 2 are calculated respectively. If it is found that there still is no intersection among the highlighting color sets 1-4, then the step continues to traverse in sequence until combinatorial policy q, under which the intersection among highlighting color sets 1-4 of the contrast element colors 1-4 is not null and the weight of the combinatorial contrast policy is the highest among all the non-null collections.

Therefore, any color in the intersection among the highlighting color sets 1-4 of the contrast element color 1-4 under Optionally, as another alternative embodiment, it is unnecessary to build the table of weights of combinatorial contrast policies in descending order, but to traverse randomly, and only record the color intersection that is not null and the corresponding combinatorial contrast policy weight. If there is a policy combination with a higher combinatorial contrast policy weight, then the previously recorded non-null color intersection and the corresponding higher combinatorial policy weight are replaced until all the combinatorial contrast policies are traversed and finally the non-null color collection with the highest weight is obtained. Then the topic element is assigned with any color in the color collection under the contrast combinatorial policy. Consequently, the topic element can be highlighted.

Figure 9:
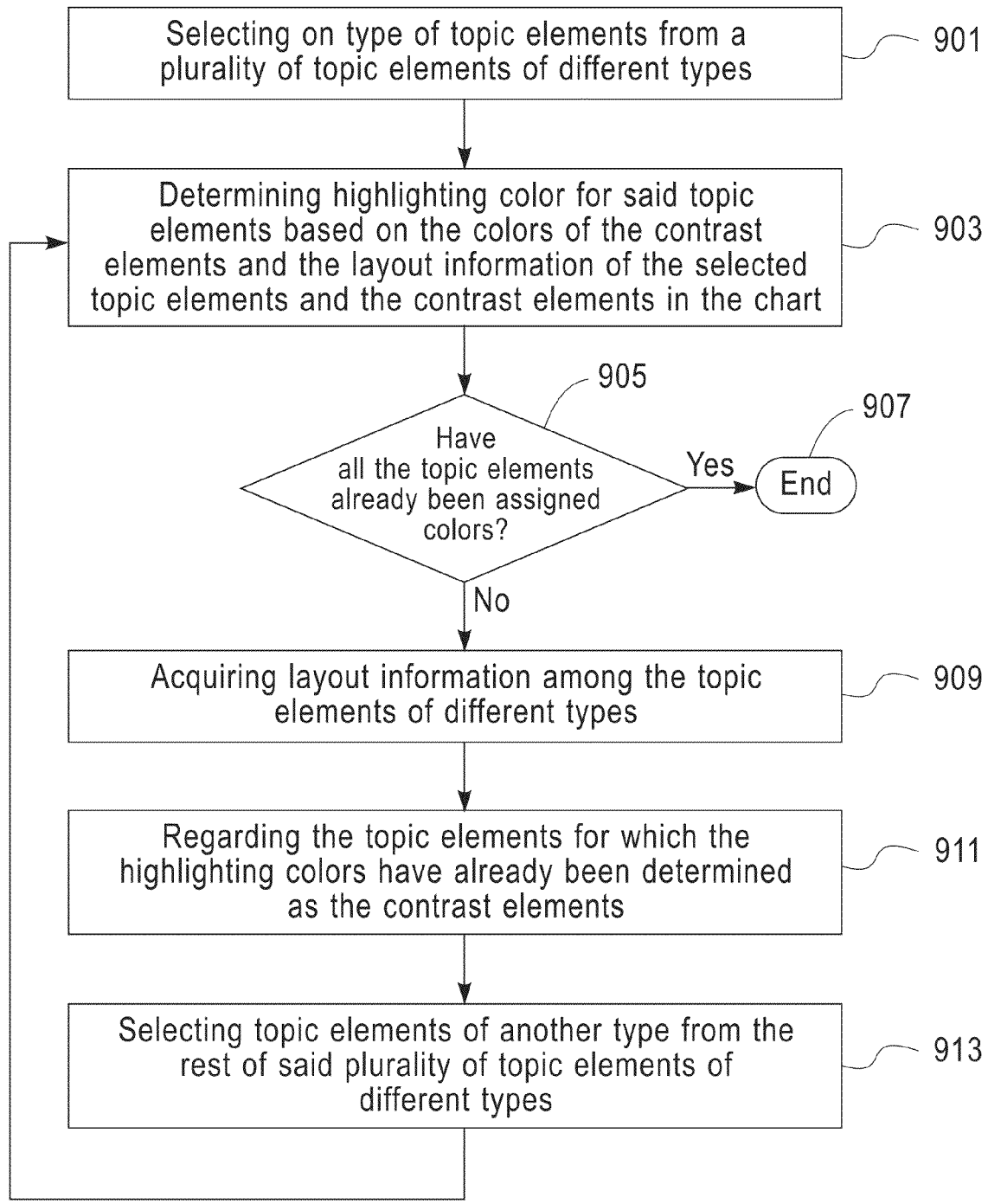
FIG. 9 shows a flowchart of another embodiment of the present invention.

Optionally, the present invention can also automatically assign highlighting colors for a plurality of topic elements of different types. FIG. 9 shows a flowchart of the embodiment for automatically assigning highlighting colors for a plurality of topic elements of different types. For the sake of simplicity, the part in the present embodiment using the same method as all of the above embodiments will not be described in detail. In step 901, one type of topic elements is selected from the plurality of topic elements of different types, and the method prepares to select the highlighting color for the selected topic elements. In step 903, determining the highlighting color of the topic elements based on the contrast element colors and the layout information between the selected topic elements and the contrast elements is performed.

As for how to determine the highlighting color of the topic elements, the methods of all of the above embodiments can be used. In step 905, it is judged whether the topic elements of all the types have been assigned with highlighting colors. If yes, the process ends at step 907. Otherwise, in step 909, obtaining the layout information among the plurality of the topic elements of different types, the layout information including positions, relative positions, and distribution regions of the topic elements is performed. Step 909 can be performed before step 905, in other words, the step for obtaining the layout information among the plurality of topic elements of different types can be performed flexibly as long as the related information is obtained before it is used. In step 911, the selected topic elements have already obtained a highlighting color, and they are now regarded as contrast elements for the rest of the different types of topic elements. If there are other contrast elements having the same color, they also can be combined.

Furthermore, it can be considered that when the topic elements serve as contrast elements, their corresponding color level standard can be the highest as far as possible in the following comparison. In step 913, another type of topic elements from the rest of the plurality of topic elements of different types is selected, and the above process is repeated until the topic elements of all the types have obtained proper highlighting colors.

Optionally, as another alternative embodiment of the above embodiment, assigning priority to the plurality of topic elements of different types can be considered. The highlighting color for topic elements having a higher priority is determined after the topic elements having a lower priority. Moreover, when the topic elements having a lower priority serve as contrast elements, the contrast policy corresponding to their color has the highest level.

Figure 10:
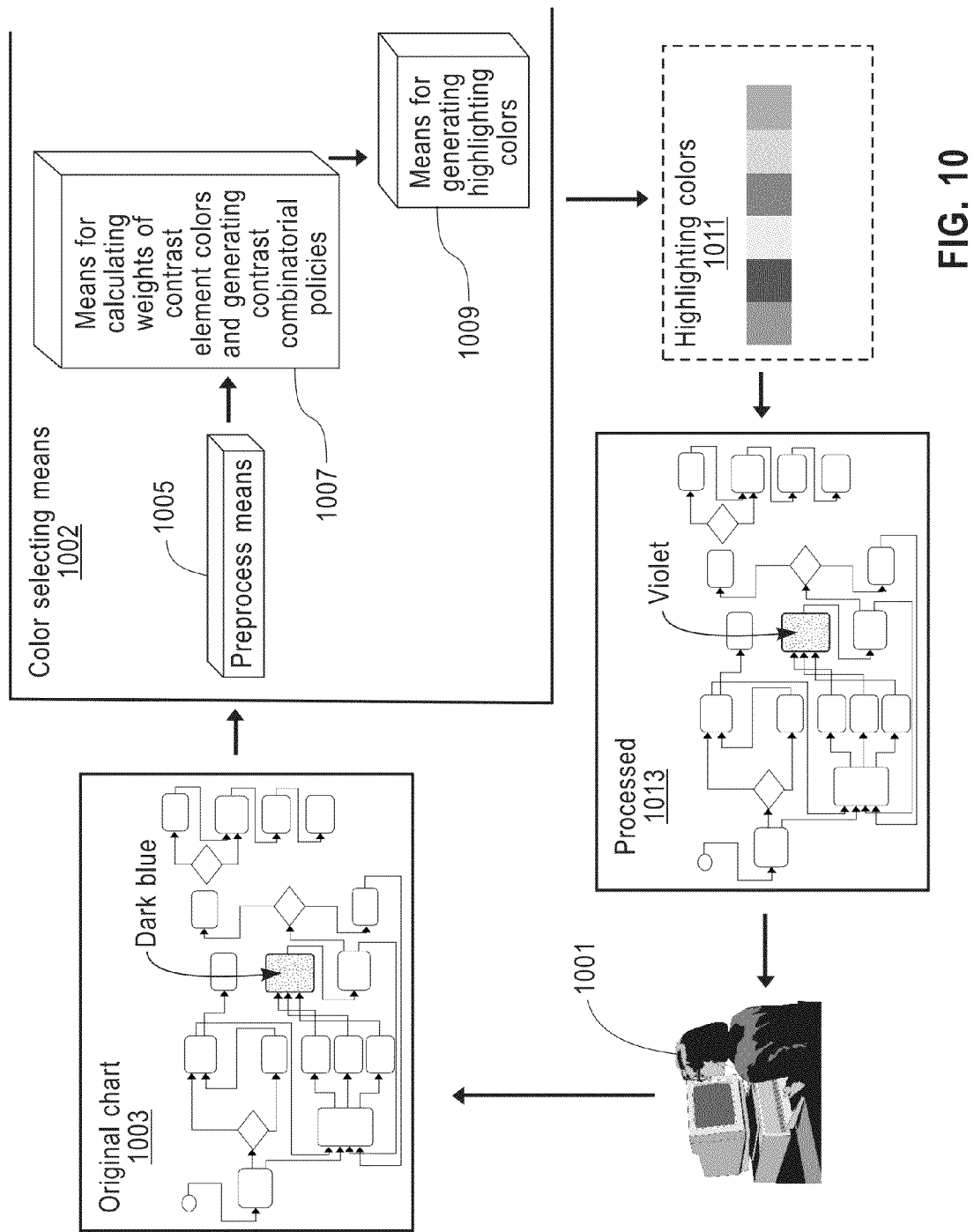
FIG. 10 shows a color selecting system of the present invention.

FIG. 10 shows a system for selecting highlighting color for topic elements, wherein a user can select an original chart 1003 through the user calculating apparatus 1001, the user calculating apparatus 1001 can be a PC, mobile phone, PDA, server or any other suitable calculating process devices. The user can designate topic elements, contrast elements in the original chart. The user can add special marks to the topic elements, contrast elements through a corresponding toolbar so as to designate the topic elements or contrast elements or just designate the topic elements. The rest are defaulted as the contrast elements or the user sets a corresponding rule based on which a program automatically identifies the topic elements and the contrast elements. A color selecting means for topic elements 1002 includes a preprocess means 1005, means 1007 for calculating weights of contrast element colors and generating combinatorial contrast policies, and means 1009 for generating highlighting color. The preprocess means 1005 receive the original chart 1003 input by the user, in which the contrast elements and topic elements are designated.

The preprocess means 1005 can process structured and unstructured charts. For a structured chart, the preprocess means 1005 identifies the contrast components and topic components selected by the user, and extracts the central positions of the respective topic components. Preprocess means 1005 also extracts colors, distribution regions of the respective contrast components, and relative position relationships between the respective contrast components and topic components, wherein the relative position relationship can include relationship such as overlapping, surrounding, and isolating.

If there are contrast components having the same color, the preprocess means 1005 further combines the distribution regions of the contrast components having the same color. For an unstructured chart, the preprocess means 1005 identifies the color blocks of the contrast elements and topic color blocks selected by the user, extracts the central position of the respective topic color blocks, and extracts the colors and distribution regions of color blocks of the respective contrast elements. Preprocess means 1005 also extracts the relative position relationship between the respective color blocks of the contrast elements and the topic color blocks, wherein the relative position relationship can include relationships such as overlapping, surrounding, and isolating.

If there are contrast color blocks having the same color, the preprocess means 1005 can further combine the distribution regions of the color blocks of the contrast elements having the same color. The preprocess means 1005 transmits the obtained related information such as topic elements, contrast elements, position information of the topic elements, position information of the contrast elements, distribution region information of the contrast elements and the relative positional information between the contrast elements and the topic elements and the like to the means 1007 for calculating weights of contrast element colors and generating combinatorial contrast policies.

The means 1007 for calculating weights of the contrast element colors and generating combinatorial contrast policies calculates weights of the contrast element colors according to the information transmitted from the preprocess means 1005. The method for calculating the weights of the contrast element colors is in accordance with the calculating methods described previously, and will not be described here any longer. The means 1007 for calculating weights of the contrast element colors and generating combinatorial contrast policies will further form combinatorial policies, form a table of combinatorial policy weights, and calculate the highlighting color set for the respective contrast element colors under the corresponding combinatorial policies.

The means 1007 for calculating weights of the contrast element colors and generating combinatorial contrast policies transmits the obtained table of combinatorial contrast policy weights and the corresponding highlighting color sets to the means 1009 for generating highlighting color. The means 1009 for generating highlighting color uses the table of combinatorial contrast policy weights and the corresponding highlighting color sets to calculate intersections of the highlighting color sets under the corresponding combinatorial policies sequentially, and selects a non-null intersection of the highlighting color sets to assign highlighting color 1011 for the topic elements, wherein the weight of the combinatorial contrast policy corresponding to the non-null intersection is the highest among weights of the combinatorial contrast policies corresponding to all the non-null intersections.

The specific method is in accordance with the calculating methods described in the above, and will not be described herein any longer. After obtaining candidate highlighting colors 1011, the color selecting means 1002 can choose to transmit the highlighting colors 1011 to the user calculating apparatus for selection, whereby generating a chart 1013, in which the topic elements have been highlighted. For example, topic element 101 shown in FIG. 1 has changed its color from dark blue and cannot be highlighted to violet with respect to its surrounding contrast elements.

As an alternative embodiment, the color selecting means 1002 can include a chart color filling means, which selects a highlighting color for topic elements according to the highlighting color set 1011 and fills the color to the topic elements, generates the chart 1013, in which the topic elements have been highlighted, and finally transmits the chart 1013 to the user.

The arrangement of the color selecting means 1002 can be very flexible. It can be arranged onto an independent server so as to provide color selecting service for the user, or can be arranged onto the user calculating means 1001 of the user so as to be associated directly and closely with related application of the user.

Moreover, the method of highlighting topic elements according to the present invention can be implemented by means of computer program product. The computer program product includes software codes portion for implementing the simulation method of the present invention when running the computer program product on a computer.

The present invention can be further implemented by recording a computer program in computer readable recording medium, the computer program includes software codes portion for implementing the simulation method of the present invention when running the computer program on a computer. That is, the process of the simulation method according to the present invention can be distributed in the form of instructions in the computer readable medium or other forms, regardless of the specific type of the signal bearing medium performing distribution in reality. The examples of computer readable medium includes medium such as EPROM, ROM, magnetic tape, paper, soft disc, hard disk drive, RAM, and CD-ROM, and transmission medium such as digital and analog communication link.

While the present invention is described and illustrated with reference to the preferred embodiments of the present invention, it is apparent to those skilled in the art that various modifications can be made to the form and detail of the present invention without departing from the spirit and scope of the present invention as defined in the appended claims.

We claim:

1. A non-transitory computer readable storage medium tangibly embodying a computer readable program code having computer readable instruction which, when implemented, cause a computer to carry out the steps of a method of selecting highlighting colors for topic elements in a chart, the method comprising:
    acquiring contrast elements and topic elements which need to be highlighted;
    acquiring colors of said contrast elements and layout information of the topic elements and the contrast elements in the chart;
    determining a plurality of combinatorial contrast policies for the colors of said contrast elements according to a color contrast standard;
    calculating weights of said combinatorial contrast policies using said layout information; and
    determining the highlighting colors for the topic elements according to said combinatorial contrast policies and their weights.

2. The non-transitory computer readable storage medium as claimed in claim 1, wherein said layout information comprises positions of the topic elements, positions of the contrast elements and distribution regions of the contrast elements.

3. The non-transitory computer readable storage medium as claimed in claim 1, wherein said step of calculating weights of said combinatorial contrast policies using said layout information comprises:
    calculating weights of colors of the contrast elements according to said layout information of the topic elements and the contrast elements in the chart; and
    calculating the weights of said combinatorial contrast policies according to said weights of colors of the contrast elements.

4. The non-transitory computer readable storage medium as in claim 3, wherein said step of determining the highlighting colors for the topic elements according to said combinatorial contrast policies and their weights comprises:
    calculating highlighting color sets corresponding to the colors of the respective contrast elements according to a current combinatorial contrast policy;
    calculating the intersection of the highlighting color sets; and
    selecting one color in the intersection corresponding to the current combinatorial contrast policy as the highlighting color of the topic elements, in response to determining that the intersection of the highlighting color sets is not null and the weight of the current combinatorial contrast policy is the maximum among the weights of all the combinatorial contrast policies under which the intersection of the highlighting color sets is not null.

5. The non-transitory computer readable storage medium as in claim 4, further comprising:
    including, in the color contrast standard, a hue difference standard and a contrast ratio standard, wherein the step of calculating highlighting color set corresponding to the colors of the respective contrast elements according to the current combinatorial contrast policy comprises:
    calculating a highlighting color set corresponding to the colors of the respective contrast elements according to the combination of the hue difference standard, the contrast ratio standard, and the current combinatorial contrast policy.

6. The non-transitory computer readable storage medium as in claim 4, wherein said layout information further comprises relative position information between the contrast elements and the topic elements.

7. The non-transitory computer readable storage medium as claimed in claim 3, wherein the weights of colors of said contrast elements are in inverse proportion with average distances from the contrast elements to the topic elements, and in proportion with the area of the distribution regions of the contrast elements.

8. The non-transitory computer readable storage medium as claimed in claim 3, wherein said step of calculating the weights of combinatorial contrast policies according to said weights of colors of the contrast elements comprises:
    multiplying the weights of colors of a plurality of the contrast elements corresponding to a current combinatorial contrast policy with the coefficients of the plurality of corresponding contrast policies in this combinatorial contrast policy;
    summing up the plurality of products resulted from the above multiplication; and
    obtaining the weight of the current combinatorial contrast policy.

9. The non-transitory computer readable storage medium as in claim 1, wherein said topic elements comprise a plurality of topic elements of different types, the method further comprising:
    selecting one type of topic element from the plurality of topic elements of different types randomly as the topic element which need to be highlighted; and
    acquiring layout information of the plurality of topic elements of different types.

10. The non-transitory computer readable storage medium as in claim 9, further comprising:
    determining that the topic elements of all the types have not been assigned the highlighting colors;
    regarding the topic elements for which the highlighting colors have already been determined as the contrast elements;
    selecting another type of topic elements from the rest of said plurality of topic elements of different types;
    determining highlighting color for the selected type of topic elements based on the colors of the contrast elements and the layout information of the selected another type of topic elements and the contrast elements, and
    repeating the above steps until the topic elements of all the types have been assigned the highlighting colors.

11. A system of selecting highlighting colors for topic elements in a chart, said system comprising:
    means for acquiring contrast elements and topic elements to be highlighted;

means for acquiring colors of said contrast elements and layout information of the topic elements and contrast elements in the chart;

means for determining a plurality of combinatorial contrast policies for the colors of said contrast elements according to a color contrast standard;

means for calculating weights of said combinatorial contrast policies using said layout information; and means for determining highlighting colors of the topic elements according to said combinatorial contrast policies and their weights.

12. The system as claimed in claim 11, wherein said layout information includes positions of the topic elements, positions of the contrast elements and distribution regions of the contrast elements.

13. The system as claimed in claim 11, wherein said means for calculating weights of said combinatorial contrast policies using said layout information comprises:

means for calculating weights of colors of the contrast elements according to said layout information of the topic elements and the contrast elements in the chart; and means for calculating the weights of combinatorial contrast policies according to said weights of colors of the contrast elements.

14. The system as claimed in claim 13, wherein said means for determining highlighting colors of the topic elements according to said combinatorial contrast policies and their weights comprises:

means for calculating highlighting color sets corresponding to the colors of the respective contrast elements according to a current combinatorial contrast policy;

means for calculating the intersection of the highlighting color sets;

means for selecting one color in the intersection corresponding to the current combinatorial contrast policy as the highlighting color of the topic elements, in response to determining that the intersection of the highlighting color sets is not null and the weight of the current combinatorial contrast policy is the maximum among the weights of all the combinatorial contrast policies under which the intersection of the highlighting color sets is not null.

15. The system as claimed in claim 14, wherein:

said color contrast standard includes a hue difference standard and a contrast ratio standard; and said means for calculating the highlighting color sets corresponding to the colors of the respective contrast elements according to the current combinatorial contrast policy comprises means for calculating the highlighting color sets corresponding to the colors of the respective contrast elements according to the combination of the hue difference standard, the contrast ratio standard, and the current combinatorial contrast policy.

16. The system as claimed in claim 14, wherein said layout information further comprises information of relative position between the contrast elements and the topic elements.

17. The system as claimed in claim 13, wherein the weights of the colors of said contrast elements are in inverse proportion with average distance from the contrast elements to the topic elements, and in proportion with the area of the distribution regions of the contrast elements.

18. The system as claimed in claim 13, wherein said means for calculating the weights of combinatorial contrast policies according to said weights of colors of the contrast elements comprises:

means for multiplying the weights of the colors of the plurality of contrast elements corresponding to a current combinatorial contrast policy with the coefficients of the plurality of corresponding contrast policies in the current combinatorial contrast policy;

means for summing up the plurality of products resulted from the above multiplication; and means for obtaining the weight of the current combinatorial contrast policy.

19. The system as claimed in claim 11, wherein:

said topic elements comprise a plurality of topic elements of different types; and said means for acquiring contrast elements and topic elements to be highlighted further comprises:

means for selecting one type of topic elements from the plurality of topic elements of different types randomly as the topic elements which need to be highlighted; and means for acquiring layout information of the plurality of topic elements of different types.

20. The system as claimed in claim 19, wherein said system further comprises:

means for judging whether the topic elements of all the types have been assigned the highlighting colors;

means for regarding the topic elements for which the highlighting colors have already been determined as contrast elements;

means for selecting another type of topic elements from the rest of said plurality of topic elements of different types; and means for determining the highlighting colors for the selected another type of topic elements based on the colors of the contrast elements and the layout information of the selected another type of topic elements and the contrast elements.

* * * * *